UNITED STATES PATENT OFFICE.

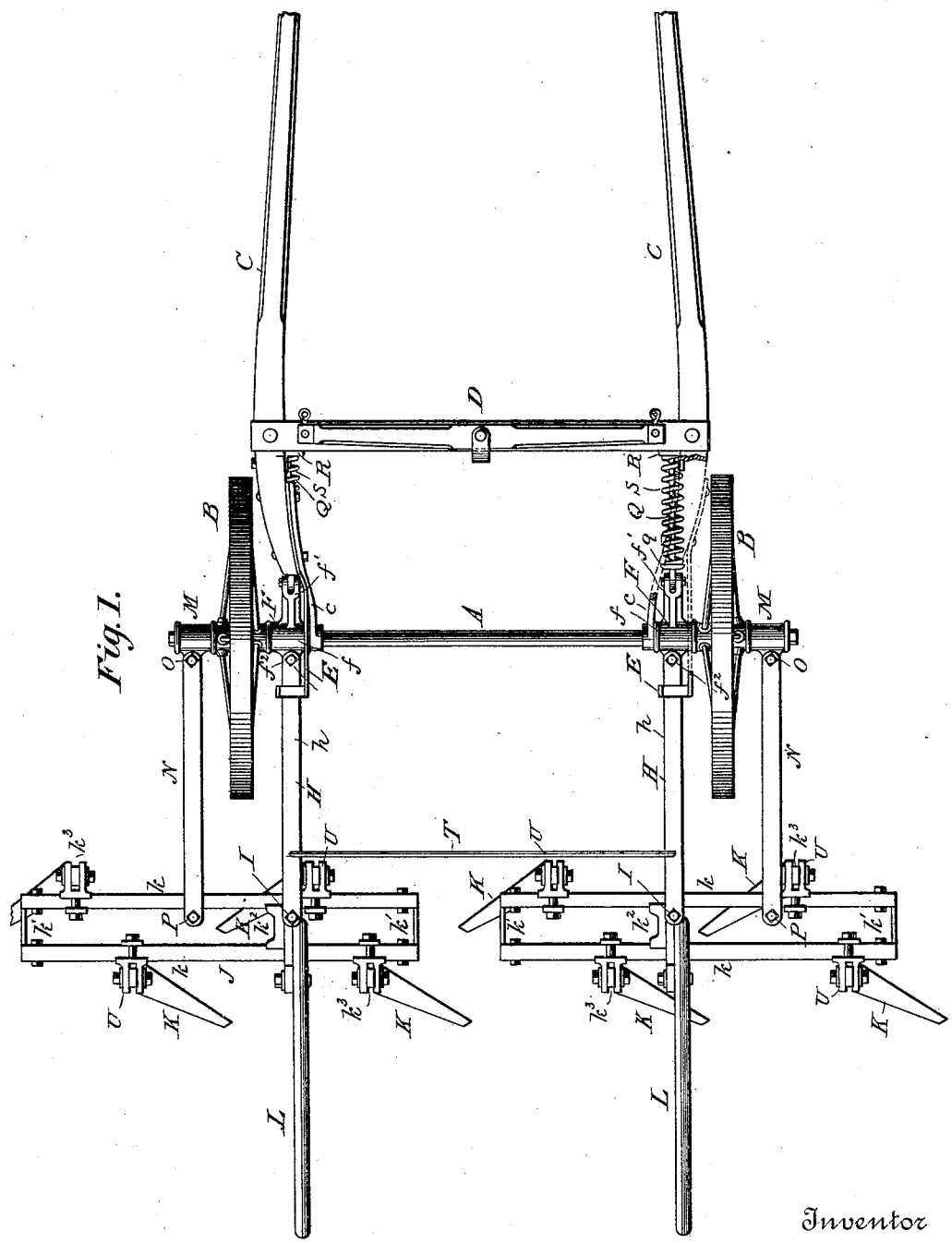

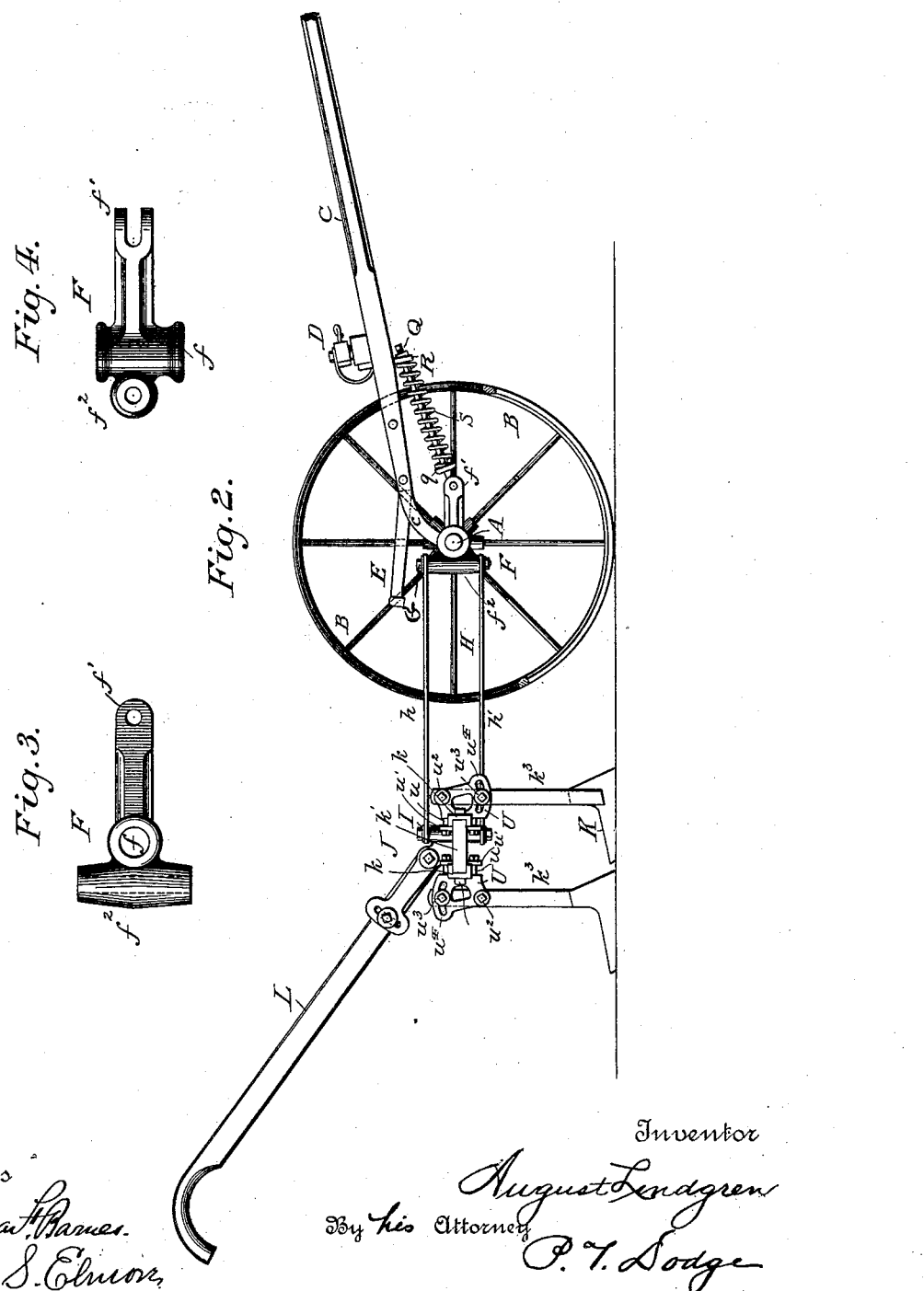

AUGUST LINDGREN, OF MOLINE, ILLINOIS, ASSIGNOR TO THE MOLINE PLOW COMPANY, OF SAME PLACE.

BEET-CULTIVATOR.

SPECIFICATION forming part of Letters Patent No. 486,614, dated November 22, 1892.

Application filed February 6, 1892. Serial No. 420,565. (No model.)

*To all whom it may concern:*

Be it known that I, AUGUST LINDGREN, of Moline, county of Rock Island, and State of Illinois, have invented a new and useful Improvement in Beet-Cultivators, of which the following is a specification.

My invention relates to a machine intended more particularly for cultivating beets, but also adapted to some extent for other purposes.

As represented in the drawings, it is adapted for the cultivation of four rows at a time.

It comprises as its essential features a wheeled frame and two laterally and vertically movable heads connected with the wheeled frame and provided with guiding-handles, as hereinafter explained.

In the accompanying drawings, Figure 1 represents a top plan view of my machine. Fig. 2 is a side elevation of the same, one of the wheels being partly broken away to expose the other parts to view. Fig. 3 is a side view of one of the draft heads or couplings. Fig. 4 is a top plan view of the same.

Referring to the drawings, A represents an axle having its ends projected through and beyond the two ground-wheels B B.

C C are shafts or thills to receive a draft-animal, connected, as usual, by a cross-bar carrying a singletree D and provided at their rear ends with draft-arms c, which encircle the axle. The respective thills are also provided with rearwardly-extending arms E, bolted rigidly thereto and so shaped in rear of the axle that the beams or draw-bars may be rested thereon when the machine is to be transported from place to place. On each end of the axle inside of the adjacent wheel I mount a tubular draft-head F, such as shown in detail in Figs. 3 and 4, having a central sleeve $f$ to encircle the axle, the forwardly-extending forked arm $f'$, and the vertical rear sleeve $f^2$. To each of these draft-heads F, I connect by a vertical pivot-bolt G a rearwardly-extending draft bar or beam H, consisting of upper and lower bars $h$ and $h'$. To the rear end of each drag-bar, between its upper and lower members $h\ h'$, I mount on a vertical pivot I a cultivator head or frame J, having a series of horizontal cultivator-blades K attached. The head may be constructed in any suitable manner, provided it is adapted to carry the series of blades. In the form shown the head consists of two bars $k$, lying transverse of the line of travel and rigidly connected at the ends by cross-bars $k'$ and at the middle by an intervening block or casting $k^2$, which serves to receive the pivot-bolt I, and also to receive and carry the guiding or steering handle L, which is bolted thereto. In order to receive this handle, the block $k^2$ has a rearwardly-extending arm, to which the handle is bolted, as plainly shown in Fig. 2.

In order to keep the head J parallel with the axle, notwithstanding its lateral movement, I provide on each end of the axle, outside of the wheel, a sleeve M, to which a bar N is connected by a vertical pivot O and extended thence rearward parallel with the drag-bar H to the head J, to which it is connected by a vertical pivot P. The drag-bar H and bar N compel the head and its blades to advance with the frame; but the vertical pivots at the front and rear ends admit of the head being moved transversely of the line of travel, so that the blades may be caused to follow the irregularities in the rows and to properly ditch the plants, the head being kept at all times parallel with the axle. The heads may also be raised and lowered freely in order to control the action of the blades. In order to assist the operator in raising the heads, each coupling $f$ has the forward end of its arm $f'$ pivoted to a rod Q, which is extended forward loosely through a guide-plate R on the shaft and encircled by a spiral spring S, which, bearing on a collar $q$ on the rod, urges the same constantly rearward. The position of the parts is such that as the heads are raised from an operative position the spring acts below the center of the axle and, pressing the arm $f'$ downward, lifts or assists in lifting the head.

The best results are secured by connecting the two heads by means of a cross-rod T, hooked into the respective drag-bars. This connection, which may be replaced by any other connection of like effect, compels the two heads, with their gangs or series of blades, to move right and left in unison; but at the same time it leaves each head free to rise and fall to a reasonable extent independently of the other.

I prefer to use blades or shares of considerable length, their forward edges lying oblique to the line of travel, the forward end being turned upward and secured rigidly to a standard $k^3$, which is in turn secured at its top to the head or frame J.

The connection may be of any suitable character; but I recommend the employment of castings U, such as are shown in the drawings, each having its forward face grooved to fit one of the horizontal beams of the head and secured thereto by horizontal bolts $u$, extending through a bearing-plate $u'$ on the opposite side of the bar or beam. This construction admits of the casting being shifted laterally in either direction, so as to change the relative positions of the blades.

I prefer to secure each standard in the casting by a horizontal pivot $u^2$ and by an upper clamping-bolt $u^3$, passed through the standard and through a fore-and-aft slot $u^4$ in the casting. This permits the inclination of the standards and blades in a fore-and-aft direction, to be varied at will, so that the forward edge of the blade may be raised or lowered as circumstances require.

I commonly provide each head with two pairs of blades for the purpose of cultivating two rows of plants. The standards of each pair are so placed that the plants may pass between them, while the blades are turned outward in opposite directions to destroy the weeds standing between the rows. When the machine is to be moved from place to place, the heads and drag-bars are raised and the drag-bars rested upon the arms E, before referred to.

The novelty of the machine resides, mainly, in the combination, with a wheeled frame, of two independently-adjustable heads or gangs of the character herein described and in the combination of such heads with a flexible connection between them.

Having thus described my invention, what I claim is—

1. In a beet-cultivator, the combination of the wheeled draft-frame, the two heads or gangs, each provided with two pairs of horizontal blades, substantially as described, and each connected with the draft-frame by parallel arms H N, one blade of each pair being set in advance of the other, substantially as shown and described.

2. In a beet-cultivator, the axle, its wheels, and draft devices, in combination with two sleeves mounted on each end of the axle and on opposite sides of the wheel, draft-bars extending rearward from the respective sleeves, two cross-heads, substantially as shown, connected one to each pair of draft-bars, handles for controlling the respective heads, and cultivator-blades, substantially as described, applied to the head in pairs.

3. In a cultivator, the combination, with the axle and its wheels, of two transverse heads in rear of the axle and parallel therewith, each carrying shovels disposed in pairs, parallel pivoted coupling-bars between each head and the axle, and a pivoted connection between the two heads, whereby they are movable laterally in unison and are maintained in position parallel to the axle, substantially as shown and described.

4. In a beet-cultivator, its wheels and the draft-frame, in combination with the two heads at the rear provided with cultivator-blades, the draft bars or beams extending forward in pairs from the respective heads, two sleeves mounted on each end of the axle on opposite sides of the wheel and jointed to the adjacent draft-bars, and a lifting-spring interposed between the draft-frame and one of the sleeves on each side of the machine.

5. In a beet-cultivator, and in combination with the laterally and vertically movable head or frame J, castings U, bolted to and movable lengthwise of the head, a standard connected to the casting by a pivot-bolt and an adjusting-bolt, as described, and a horizontal obliquely-arranged blade attached to the lower end of the standard, whereby the blade may be adjusted both as to its lateral position and as to its fore-and-aft inclination.

6. In combination with the axle and its wheels, the draft-frame journaled upon the axle and provided with the rigid arms E, the shovel-carrying heads, the sleeves upon the axle, and the draft bars or beams H and N, connecting the sleeves and the head, the beams H being adapted to be rested upon the arms G, as and for the purpose described.

7. In a beet-cultivating machine, the combination of a draft-frame, two elongated heads or frames lying transversely in rear of the draft-frame and each provided with a series of cultivator-blades T, and the draft-bars $h$, $h'$, and N, connecting the heads and the draft-frame and mounted on pivots at their two ends, whereby the heads or gangs are permitted to move laterally and vertically, and also permitted to rock or tip sidewise that the blades may follow the surface of the ground.

In testimony whereof I hereunto set my hand, this 14th day of December, 1891, in the presence of two attesting witnesses.

AUGUST LINDGREN.

Witnesses:
S. M. HILL,
W. V. RICHARDS.